Jan. 31, 1956

E. LIST 2,733,360

ELECTROMAGNETICALLY-OPERATED OSCILLATING MOTOR

Filed April 22, 1953

INVENTOR.
ENRIQUE LIST
BY

INVENTOR.
ENRIQUE LIST
BY

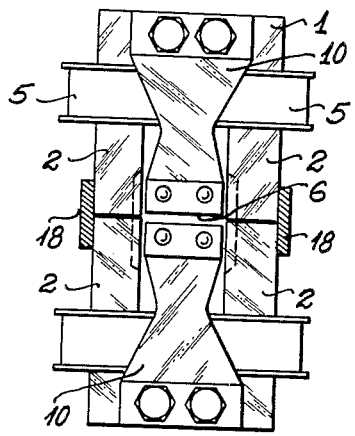
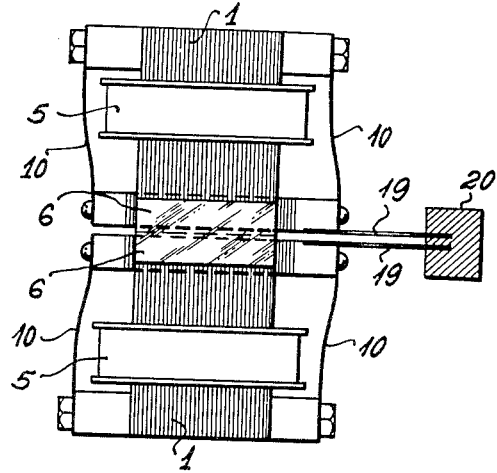

United States Patent Office 2,733,360
Patented Jan. 31, 1956

2,733,360
ELECTROMAGNETICALLY-OPERATED OSCILLATING MOTOR

Enrique List, Buenos Aires, Argentina

Application April 22, 1953, Serial No. 350,317

11 Claims. (Cl. 310—29)

My present invention relates to certain new and useful improvements in electromagnetically-operated oscillating motors and more particularly refers to an improved electromagnetically-operated oscillating motors of the type comprising toothed stator and armature pole pieces and having the armature arranged in shearing relation to the stator and reciprocating with a number of oscillations equal the frequency or twice the frequency of the alternating current.

Electromagnetically-operated oscillation motors having the armature arranged between the pole pieces of an electromagnet excited by alternating current and in shearing relation to said pole pieces i. e. so as to reciprocate in a direction perpendicular to the lines of force of the startor are already known. These known electromagnetically-operated oscillating motors may have, for instance, a stator of the form of a shell type transformer having its centre leg formed with two poles between which the armature is oscillatorily arranged. Such an arrangement, however, is disadvantageous insofar as it is rather difficult to correctly guide the armature in a direction parallel to the pole pieces of the stator. In connection herewith reference may be made to my co-pending applications Serial Nos. 318,285 and 318,286.

Other known electromagnetically-operated oscillating motors comprise a bridging armature which is arranged in the form of a bridge in front of the pole pieces of the stator. It is further known to suspend the armatures of these motors by means of leaf springs fixedly secured at one end to the armature and at the opposite end to the yoke of the stator. This arrangement is disadvantageous insofar as during the oscillations of the armature the gap between the latter and the startor continuously increases and diminishes in view of that due to the suspension of the armature by means of the leaf springs the same executes a rocking motion. Therefore, in order to avoid a contact between the armature and the stator, it is necessary to provide for a very solid and correspondingly expensive construction.

Now, the main object of my present invention is to provide an improved simple and inexpensive electromagnetically-operated oscillating motor of a relatively small construction, but nevertheless of relatively high capacity, wherein the armature is guided in a direction parallel to the stator in a most simple, but efficient manner.

One object of the invention is to provide an improved electromagnetically-operated oscillating motor, having a U-shaped stator with at least one magnetic coil, and an armature oscillatorily arranged between the legs or pole pieces of said stator in such a manner that the armature reciprocates in a direction perpendicular to the magnetic lines of force of the stator.

Another object of the invention is to provide an improved electromagnetically-operated oscillating motor, wherein the inner surfaces of the legs of the U-shaped stator are provided with teeth and the armature reciprocating between said teeth is provided with like teeth in shearing relation to the toothed pole pieces of the stator.

Still another object of the invention is to provide an improved electromagnetically-operated oscillating motor, wherein the oscillating armature is suspended at both ends by means of leaf springs fixedly secured to the yoke of the metal sheets or stampings of the stator in such a manner that lateral displacements of the oscillating armature are rendered practically impossible and that by virtue hereof the gaps between the armature and the stator may be advantageously reduced to about 0.01 inch and less.

An additional object of the invention is to provide an improved electromagnetically-operated oscillating motor, wherein the teeth of the armature and stator or the free spaces between such teeth extend in the direction of the legs or pole pieces of the U-shaped stator, with the advantageous result that the same may be readily produced by a corresponding arrangement of the metal sheets or stampings composing the armature and stator, for which purpose it is sufficient to assemble like groups of metal sheets or stampings in such a manner that the edge of one group projects beyond the respective edge of the adjacent group. It is also possible to use groups of metal sheets of different breadth and to form the teeth by alternately assembling groups of narrow sheets between groups of broader sheets, thereby avoiding the necessity of preparing special matrix for stamping the teeth in the metal sheets. An additional advantage of the toothed stator according to this invention consists in that the magnet coils may be previously wound and the finished coils may be readily slipped over the legs of the U-shaped stator.

According to one feature of the invention, the improved electromagnetically-operated oscillating motor comprises leaf spring assemblies for suspending and guiding the oscilating armature in a direction parallel to the pole pieces of the stator, which are of such a stiffness that they simultaneously may act as working springs. It is, of course, also possible to provide in combinnation with the leaf springs for the elastic suspension of the armature helical springs acting as said working springs or secondary driving means.

According to another feature of the invention, a possibility of reducing the specific load of the individual leaf springs consists in increasing the length of the springs between their fixing points. In accordance with the invention, for this purpose spacer elements may be provided between the yoke of the stator and the leaf spring assemblies for upwardly displacing the fixing points of the same.

In accordance with an additional feature of my present invention, rotary oscillations of the stator of the electromagnetically-operated oscillating motor may be efficiently prevented from being transmitted to the casing or another supporting structure of the motor by suspending the motor by means of rubber elements arranged at the centre portion of the stator yoke and preferably at the centre of the front and back sides of the stator and capable of absorbing the said rotary oscillations.

According to still another feature of my present invention, the improved electromagnetically-operated oscillating motor comprises a magnetic bridge arranged in front of the free ends of the stator legs in such a manner that the distance between said bridge and these legs ends may be varied, thereby providing a regulating means for increasing or diminishing the magnetic flux through the armature of the electromagnetically-operated motor with the advantageous result that the power of the motor may be regulated as desired.

For certain applications of the electromagnetically-operated oscillating motor as hereinbefore described it will be disadvantageous if the stator and the armature in addition to the desired reciprocating movements are subjects to a tilting oscillation likely to be caused by that the centers of gravity of the two oscillating masses are not situated on the same plane. In accordance with another feature of this invention, these tilting oscillations may be considerably reduced in such a manner that the armature is provided with an additional mass the center of gravity of which is displaced towards the center of gravity of the stator.

A complete elimination of the tilting oscillations of the armature and stator as well as a perfect compensation of the oscillations of the stator may be attained, in accordance with an additional feature of the invention, in such a manner that two electromagnetically-operated oscillating motors as hereinbefore described are arranged side by side, in which arrangement their stators are rigidly interconnected, whereas their armatures oscillate in opposite directions. This arrangement of the improved electromagnetically-operated oscillating motor is particularly advantageous for all those applications where the forces and output have to be directly taken off between the two contrarily oscillating armatures.

Another method of entirely eliminating the tilting oscillations of the stator consists in that according to the invention two of the electromagnetically-operated oscillating motors as hereinbefore described are combined with each other in such a manner that they are rigidly interconnected with the free ends of their stator legs arranged opposite each other, in which arrangement their armatures are interconnected by elastic means which, however, have to be rigid in the direction of motion of the armatures. This arrangement offers the advantage that the armatures of the two motors oscillate in the same direction.

With these objects and advantageous features in view, the present invention comprises the arrangement, combination and construction of parts as will be hereinafter fully described with particular reference to the accompanying drawings, whereon I have illustrated by way of examples only several embodiments of my invention, and whereon:

Figures 1, 2, and 3 show a preferred embodiment of my improved electromagnetically-operated oscillating motor in partly sectional side view, plan view and front view, respectively;

Figures 6 and 7 show in front and side views, respectively, the combination of two electromagnetically-operated oscillating motors with their stators in opposite arrangement.

Figure 1:
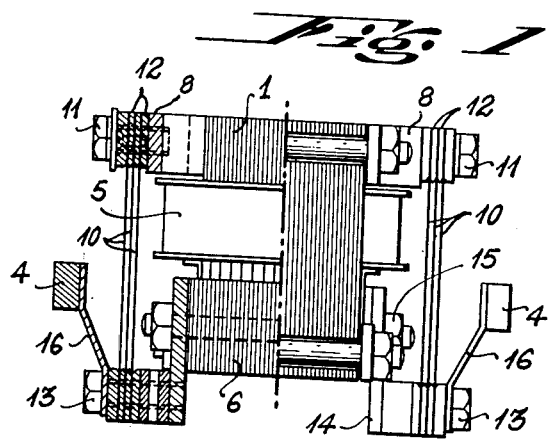

Referring to the accompanying drawings and more particularly to Figures 1 to 4, the improved electromagnetically-operated oscillating motor according to my present invention comprises a U-shaped stator 1. The leg portions 2 of this stator are provided on the inner opposite surfaces with teeth 3 as clearly shown in Figure 4. The leg portions 2 are surrounded by magnet coils 5 to form in combination with the stator 1 an electromagnet, which when energized by alternating current acts upon the armature 6. This armature is so arranged that it may freely oscillate between the toothed pole pieces 2 of the stator 1, and is provided with the pole teeth 7 arranged in so-called shearing relation to the teeth 3 of the stator 1.

Figure 2:
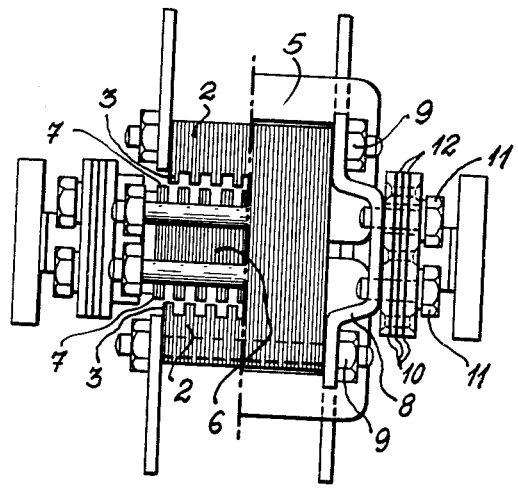

At both sides of the yoke of the U-shaped stator 1 there is provided a brace member 8 as clearly shown in Figure 2. These brace members 8 are secured to the stator 1 by means of screw bolts 9 which at the same time serve for assembling the metal sheets or stampings of the stator.

The brace members 8 at both side of the stator 1 carry elastic suspension devices each formed by an assembly of three leaf springs 10 fixedly secured to said brace members by means of screws 11. The individual leaf springs are riveted together at both ends with the interposition of flat spacers as indicated at 12. The lower ends of the spring assemblies are fixedly secured by screws 13 to end plates 14 of the armature 6, said end plates and the metal sheets or stampings of the armature being fixedly joined by means of screw bolts 15.

When the coils 5 are connected to a source of alternating current, the armature 6 will be caused to oscillatorily reciprocate between the toothed pole pieces 2 of the stator 1. The number of oscillations of the armature may be twice the frequency of the alternating current, in which case during one half of each period of oscillation of the alternating current each stator tooth 3 attracts the respective opposite armature tooth 7 and as soon as the zero point of the alternating current curve is reached, the armature 6 is returned to its initial or normal position by the elastic force of the leaf spring assemblies 10.

Figure 3:
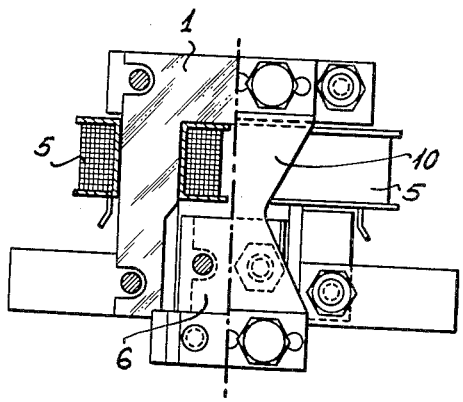
Figure 4:
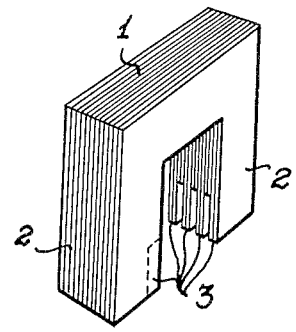
Figure 4 is a perspective detail view of the stator of the motor according to Figures 1, 2, and 3.

The electromagnetically-operated oscillating motor as shown in Figures 1 to 3, however, is particularly designed for being operated at an oscillating frequency equal to the frequency of the alternating current. For this purpose, in the normal position of the armature 6 the teeth 7 thereof are situated in front of the free spaces formed between the teeth 3 of the stator 1, in which arrangement the stiffness of the leaf spring assemblies 10 must be such that the oscillating system formed by the two oscillating masses consisting of the stator and of the armature and their pertinent parts, respectively, has a natural mechanical frequency substantially equal the frequency of the alternating current. In the arrangement as shown the leaf spring assemblies 10 suspend the armature 6 in such a manner that lateral displacements thereof can not occur and that by virtue hereof the gaps between stator and armature may be effectively reduced to 0.2 millimeter and less.

A characteristic feature of the construction of the leaf spring assemblies 10, which during the oscillations of the armature 6 are bent into an S-shape, consists in that the individual leaf springs are X-shaped as clearly shown in Figure 3, for the purpose of ensuring that the same be subject to uniform strain of flexure over their entire cross section.

The improved electromagnetically-operated oscillating motor, according to this invention and as shown in Figures 1 to 3, is completed by a pair of counter-weights 4 which by means of suitable arms 16 are supported by the screw bolts 13 and thus are rigidly connected to the armature 6. The arrangement of the counter-weight elements 4 is such that the center of gravity of the armature is displaced upwardly, i. e., so as to approach the center of gravity of the stator whereby eventual tilting oscillations of the armature and stator, which may occur if the centers of gravity of the two oscillating masses are not situated on the same plane, are efficiently reduced.

Figure 5:
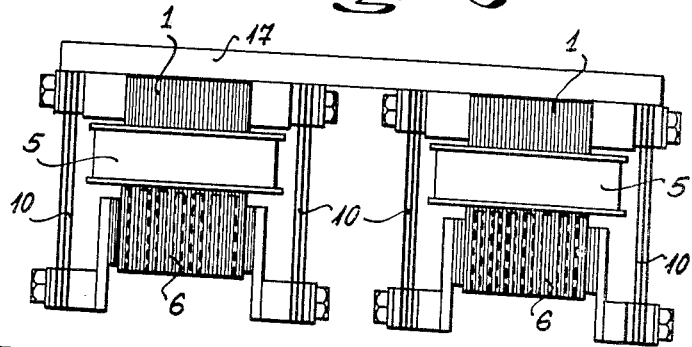
Figure 5 is a schematic view showing the combination of two electromagnetically-operated oscillating motors in side by side arrangement.

The afore-mentioned tilting oscillations of the armature and stator may be efficiently eliminated by means of the embodiment of this invention as shown in Figure 5, according to which two of the improved electromagnetically-operated oscillating motors are combined into one motor unit. According to Figure 5 the stators 1 of the two motors are rigidly interconnected with a magnet coil 5 and 17. Each stator is provided with an armature 6 suspended by leaf spring assemblies 10. Thus the construction of the two motors is substantially the same as that of the motor as described with reference to Figures 1 to 4. The arrangement of the armatures 6, however, is such that they each time move in opposite direction, i. e., while one armature moves to the left, the second one moves to the right, with the advantageous result that the stator of the motor is absolutely free of any undesired vibrations. This embodiment of my invention is particularly advantageous for the construction of tools and household apparatus which are to be operated by means of a fixed handle and the handle of which should be conveniently free of any vibration.

A similar embodiment of my invention has been shown in Figures 6 and 7, according to which two electro-magnetically-operated oscillating motors are combined with each other in such a manner that their stators are rigidly interconnected with the free ends of their legs in contact with each other. According to Figures 6 and 7, the opposite legs 2 of the stators 1 are rigidly interconnected by means of plates 18. Each stator is provided with a magnet coil 5 and acts upon an armature 6 suspended by X-shaped leaf springs 10. Although in Figure 7 only one spring has been shown at each side of each stator and armature, it has to be understood that the suspension of the armatures is effected by leaf spring assemblies as shown in Figures 1, 2 and 5.

The arrangement of the armatures 6 is such that they oscillate in the same direction. Figure 7 shows the armatures 6 in a position in which they have finished their stroke of oscillation towards the right hand side. Due to its elastic suspension, each armature describes during the oscillations a flat curve; therefore the two armatures can not be rigidly interconnected. Therefore, the two armatures 6 are provided with leaf springs 19 anchored in a movably arranged part 20, the arrangement being such that the latter may effect a reciprocating motion in accordance with the oscillatory motion of the armatures. By virtue of the rigid interconnection of the two stators 1 the tilting oscillations which may occur in the operation of a single electromagnetically-operated oscillating motor as hereinbefore explained are completely avoided.

Figure 8:
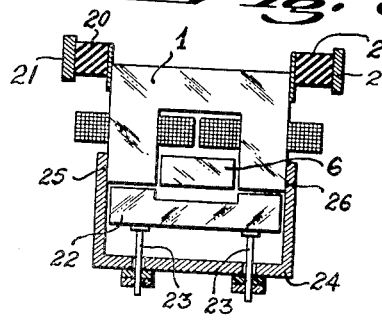
Figure 8 is a partly sectional side elevation of my electromagnetically-operated oscillating motor showing certain additional advantageous features of the same.

Referring to Figure 8 of the accompanying drawing, the same schematically illustrates my improved electro-magnetically-operated oscillating motor as shown in Figure 1, having a stator 1, at least one field coil 5, an oscillating armature 6 and an elastic suspension formed by leaf spring assemblies (not shown in Fig. 8) for elastically suspending said armature. In this embodiment, cylindrical rubber elements 20 are arranged at the centre of the front and back sides of the yoke of the stator 1 and secured, at the one hand, to suitable supports 21 of the motor and, at the other hand, to the stator for elastically suspending the latter and for preventing rotary oscillations from being transmitted from the motor to its casing or another support structure, these rubber elements 20, of course, may be arranged in any other suitable manner.

Another advantageous feature of my improved electro-magnetically-operated oscillating motor consists in the provision of a magnetic bridge 22 arranged in front of the free ends of the legs of the U-shaped stator 1 and provided with screw bolts 23, passing through corresponding perforations of a supporting member 24 and being capable of varying the distance between the bridge 22 and the legs ends and of thereby increasing or diminishing the magnetic flux through the armature 6 and regulating the power of the electromagnetically-operated oscillating motor.

Instead of vertically moving the magnetic bridge 22 as hereinbefore described it is also possible to pivotally mount the same, for instance, at the point 25 and to provide at the opposite side 26 for a fixing means capable of regulating the distance of the right hand end portion of the bridge 22 from the stator 1. It is also possible to mount the bridge 22 in a slidable manner so as to change its position with regard to the stator and to thereby obtain the desired regulation of the power of the motor. Finally, the rotative movement of the bridge 22 may be combined, if desired, with a vertical or horizontal displacement thereof.

What I claim as new and desire to secure by Letters Patent is:

1. Electromagnetically-operated oscillating motor, comprising a U-shaped stator provided with at least one field coil, pole teeth provided on the inner opposite surfaces of the free end portions of the leg of the U-shaped stator projecting beyond said field coil, a toothed armature oscillatorily arranged between said stator legs and in shearing relation to the pole teeth of the latter, and a pair of leaf spring assemblies rigidly secured at one end to said armature and at the other end to the yoke of the stampings composing said stator for permitting said armature to oscillate in a direction perpendicular to the lines of force of said stator.

2. Electromagnetically-operated oscillating motor, comprising a U-shaped stator provided with at least one field coil, pole teeth provided on the inner opposite surfaces of the free end portions of the legs of the U-shaped stator projecting beyond said field coil, a toothed armature oscillatorily arranged between said stator legs and in shearing relation to said pole teeth of the latter, the pole teeth of said stator and said armature being formed by groups of stampings in their normal position, and a pair of leaf spring assemblies rigidly secured at one end to said armature and at the other end to the yoke of the stampings composing said stator for permitting said armature to oscillate in a direction perpendicular to the lines of force of said stator.

3. Electromagnetically-operated oscillating motor, comprising a U-shaped stator provided with at least one field coil, pole teeth provided on the inner opposite surfaces of the free end portions of the legs of the U-shaped stator projecting beyond said field coil, a toothed armature oscillatorily arranged between said stator legs and in shearing relation to said pole teeth of the latter, the pole teeth of said stator and said armature being formed by cavities produced by the arrangement of groups of narrow stampings between groups of broader stampings, and a pair of leaf spring assemblies rigidly secured at one end to said armature and at the other end to the yoke of the stampings composing said stator for permitting said armature to oscillate in a direction perpendicular to the lines of force of said stator.

4. In an electromagnetically-operated oscillating motor according to claim 1, the provision of leaf spring assemblies capable of simultaneously acting as working springs.

5. In an electromagnetically-operated oscillating motor according to claim 1, the combination of the said leaf spring assemblies with helical springs acting as working springs.

6. In an electromagnetically-operated oscillating motor according to claim 1, the provision of spacer bodies arranged between the yoke of the stator and the leaf spring assemblies for outwardly displacing the fixing points of said leaf spring assemblies.

7. In an electromagnetically-operated oscillating motor according to claim 1, the provision of counter-weight elements fixedly secured to the armature for displacing the center of gravity of the latter towards the center of gravity of the stator.

8. In an electromagnetically-operated oscillating motor according to claim 1, the provision of elastic bodies preferably arranged at the centre of the front and back sides of the stator yoke for elastically mounting the motor and enabling the latter to effect rotary oscillations.

9. In an electromagnetically-operated oscillating motor according to claim 1, the provision of a movable magnetic bridge arranged in front of the free ends of the stator legs and provided with supporting means for regulating the position of said bridge with regard to said leg ends.

10. Electromagnetically-operated oscillating motor, comprising two U-shaped stators each provided with at least one field coil a solid bar member for rigidly interconnecting the two stators in side by side arrangement, pole teeth provided on the inner opposite surfaces of the free end portions of the legs of the U-shaped stators projecting beyond said field coils, a toothed armature oscillatorily arranged between the legs of each stator and in shearing relation to the pole teeth of the latter and so that the two armatures oscillate contrarily to each other, and a pair of leaf spring assemblies for each armature rigidly secured at one end to said armature and the other end to the yoke of the stampings composing the pertinent stator for permitting each armature to oscillate in a direction perpendicular to the lines of force of the respective stator.

11. Electromagnetically-operated oscillating motor, comprising two U-shaped stators each provided with at least one field coil, a pair of fish plates for rigidly interconnecting the two stators with the free ends of their legs in contact with each other, pole teeth provided on the inner opposite surfaces of the free end portions of the legs of each stator and in shearing relation to the pole teeth of the latter and so that the two armatures oscillate in the same direction, a pair of leaf spring assemblies for each armature rigidly secured at one end to said armature and at the other end to the yoke of the stampings composing the pertinent stator for permitting each armature to oscillate in a direction perpendicular to the lines of force of the respective stator, and elastic members which, however, are rigid in the direction of the reciprocating movement of said armatures, for interconnecting the latter.

References Cited in the file of this patent

UNITED STATES PATENTS

| | | |
|---|---|---|
| 1,413,374 | Avery | Apr. 18, 1922 |

FOREIGN PATENTS

| | | |
|---|---|---|
| 498,041 | Great Britain | Jan. 3, 1939 |